United States Patent
Ingraham et al.

(10) Patent No.: US 6,913,846 B2
(45) Date of Patent: Jul. 5, 2005

(54) INTEGRATED FUEL CELL SYSTEM

(75) Inventors: Jeffrey E. Ingraham, Albany, NY (US); Richard H. Cutright, Corinth, NY (US)

(73) Assignee: Plug Power Inc., Latham, NY (US)

( * ) Notice: Subject to any disclaimer, the term of this patent is extended or adjusted under 35 U.S.C. 154(b) by 463 days.

(21) Appl. No.: 10/158,367

(22) Filed: May 30, 2002

(65) Prior Publication Data

US 2002/0182458 A1 Dec. 5, 2002

Related U.S. Application Data

(60) Provisional application No. 60/294,781, filed on May 31, 2001.

(51) Int. Cl.$^7$ .............................. H01M 8/18; H01M 2/14
(52) U.S. Cl. .............................. 429/19; 429/20; 429/38; 429/39
(58) Field of Search ............................ 429/19, 20, 38, 429/39, 42, 17, 13, 40, 44, 30, 62, 34, 15, 32, 26, 35, 96, 16; 502/332, 216; 423/656, 359, 247, 652; 562/517; 422/177, 191, 190; 204/253; 44/302

(56) References Cited

U.S. PATENT DOCUMENTS

| | | | | |
|---|---|---|---|---|
| 4,081,409 A | * | 3/1978 | McNicol et al. | 502/332 |
| 5,482,680 A | * | 1/1996 | Wilkinson et al. | 422/177 |
| 5,658,681 A | * | 8/1997 | Sato et al. | 429/13 |
| 5,863,673 A | * | 1/1999 | Campbell et al. | 429/44 |
| 6,060,190 A | * | 5/2000 | Campbell et al. | 429/40 |
| 6,309,769 B1 | * | 10/2001 | Haug | 429/13 |
| 6,387,555 B1 | * | 5/2002 | Wheeler et al. | 429/17 |
| 6,818,341 B2 | * | 11/2004 | Uribe et al. | 429/42 |

\* cited by examiner

*Primary Examiner*—Michael Barr
*Assistant Examiner*—Robert Hodge
(74) *Attorney, Agent, or Firm*—Trop, Pruner & Hu, P.C.

(57) ABSTRACT

The invention provides a fuel cell system utilizing a shift reaction catalyst disposed within the fuel cell to reduce carbon monoxide present in the fuel stream.

18 Claims, 4 Drawing Sheets

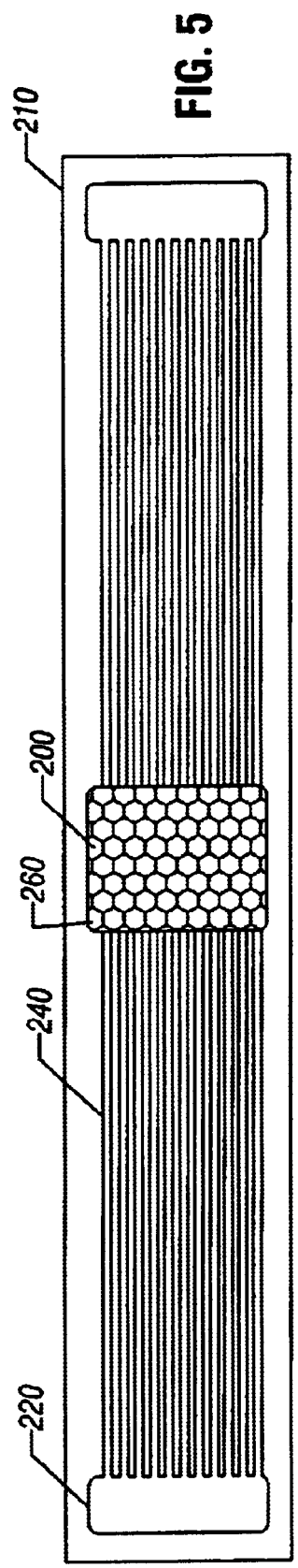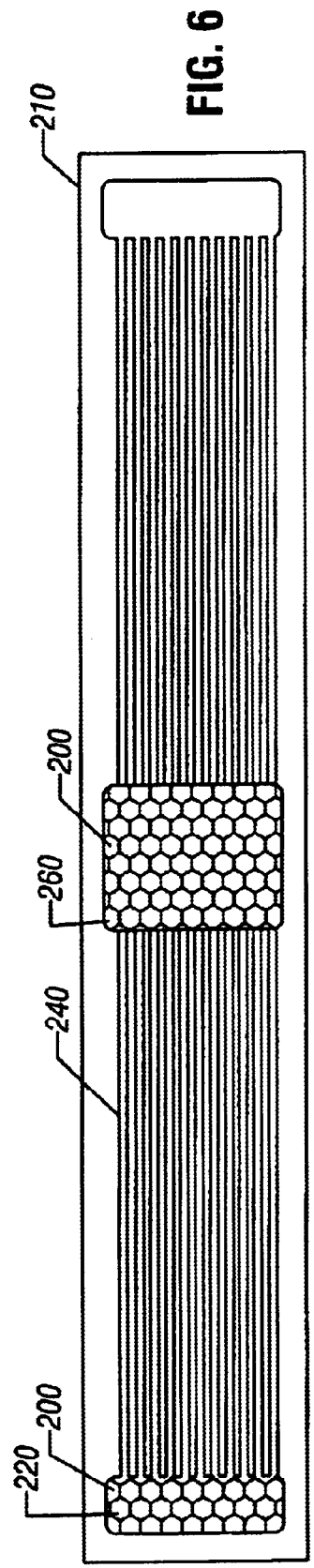

INTEGRATED FUEL CELL SYSTEM

CROSS REFERENCE TO RELATED APPLICATIONS

This application claims priority under 35 USC 119(e) from U.S. Provisional Application No. 60/294,781, filed May 31, 2001, naming Ingraham and Cutright as inventors, and titled "INTEGRATED FUEL CELL SYSTEM." That application is incorporated herein by reference in its entirety and for all purposes.

BACKGROUND

The invention generally relates to an integrated fuel cell system, more particularly to an integrated fuel cell system whereby a fuel processing shift reaction occurs within the fuel cell stack assembly.

A fuel cell is an electrochemical device that converts chemical energy produced by a reaction directly into electrical energy. For example, one type of fuel cell includes a polymer electrolyte membrane (PEM), often called a proton exchange membrane, which permits only protons to pass between an anode and a cathode of the fuel cell. At the anode, hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \text{ at the anode of the cell} \quad (1)$$

$$O_2 + 4H^+ + 4e^- \rightarrow 2H_2O \text{ at the cathode of the cell} \quad (2)$$

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. Exemplary fuel processor systems are described in U.S. Pat. Nos. 6,207,122, 6,190,623, 6,132,689, which are hereby incorporated by reference.

The two reactions which are generally used to convert a hydrocarbon fuel into hydrogen are shown in equations (3) and (4).

$$\tfrac{1}{2}O_2 + CH_4 \rightarrow 2H_2 + CO \quad (3)$$

$$H_2O + CH_4 \rightarrow 3H_2 + CO \quad (4)$$

The reaction shown in equation (3) is sometimes referred to as catalytic partial oxidation (CPO). The reaction shown in equation (4) is generally referred to as steam reforming. Both reactions may be conducted at a temperature from about 600–1,100° C. in the presence of a catalyst such as platinum. A fuel processor may use either of these reactions separately, or both in combination. While the CPO reaction is exothermic, the steam reforming reaction is endothermic. Reactors utilizing both reactions to maintain a relative heat balance are sometimes referred to as autothermal (ATR) reactors. It should be noted that fuel processors are sometimes generically referred to as reformers, and the fuel processor output gas is sometimes generically referred to as reformate, without respect to which reaction is employed.

As evident from equations (3) and (4), both reactions produce carbon monoxide (CO). Such CO is generally present in amounts greater than 10,000 parts per million (ppm). Because of the high temperature at which the fuel processor is operated, this CO generally does not affect the catalysts in the fuel processor. However, if this reformate is passed to a prior art fuel cell system operating at a lower temperature (e.g., less than 100° C.), the CO may poison the catalysts in the fuel cell by binding to catalyst sites, inhibiting the hydrogen in the cell from reacting. In such systems it is typically necessary to reduce CO levels to less than 100 ppm to avoid damaging the fuel cell catalyst. For this reason the fuel processor may employ additional reactions and processes to reduce the CO that is produced. For example, two additional reactions that may be used to accomplish this objective are shown in equations (5) and (6). The reaction shown in equation (5) is generally referred to as the shift reaction, and the reaction shown in equation (6) is generally referred to as preferential oxidation (PROX).

$$CO + H_2O \rightarrow H_2 + CO_2 \quad (5)$$

$$CO + \tfrac{1}{2}O_2 \rightarrow CO_2 \quad (6)$$

Various catalysts and operating conditions are known for accomplishing the shift reaction. For example, the reaction may be conducted at a temperature from about 300–600° C. in the presence of supported platinum. Other catalysts and operating conditions are also known. Such systems operating in this temperature range are typically referred to as high temperature shift (HTS) systems. The shift reaction may also be conducted at lower temperatures such as 100–300° C. in the presence of other catalysts such as copper supported on transition metal oxides. Such systems operating in this temperature range are typically referred to as low temperature shift (LTS) systems. Other catalysts and operating conditions are also known. In a practical sense, typically the shift reaction may be used to lower CO levels to about 1,000–10,000 ppm, although as an equilibrium reaction it may be theoretically possible to drive CO levels even lower.

The PROX reaction may also be used to further reduce CO. The PROX reaction is generally conducted at lower temperatures than the shift reaction, such as 70–200° C. Like the CPO reaction, the PROX reaction can also be conducted in the presence of an oxidation catalyst such as platinum. The PROX reaction can typically achieve CO levels less than 100 ppm (e.g., less than 50 ppm).

In general, fuel cell power output is increased by raising fuel and air flow to the fuel cell in proportion to the stoichiometric ratios dictated by the equations listed above. Thus, a controller of the fuel cell system may monitor the output power of the stack and based on the monitored output power, estimate the fuel and air flows required to satisfy the power demand. In this manner, the controller regulates the fuel processor to produce this flow, and in response to the controller detecting a change in the output power, the controller estimates a new rate of fuel flow and controls the fuel processor accordingly.

The ratio of fuel or air provided to a fuel cell in relation to what is theoretically required by a given power demand is sometimes referred to as "stoich". For example, 1 anode stoich refers to 100% of the hydrogen theoretically required to meet a given power demand, whereas 1.2 stoich refers to 20% excess hydrogen over what is theoretically required. Since in real conditions it is typical that not all of the hydrogen or air supplied to a fuel cell will actually react, it may be desirable to supply excess fuel and air to meet a give power demand.

The fuel cell system may provide power to a load, such as a load that is formed from residential appliances and electrical devices that may be selectively turned on and off to vary the power that is demanded. Thus, in some applications the load may not be constant, but rather the power that is consumed by the load may vary over time and change abruptly. For example, if the fuel cell system provides power to a house, different appliances/electrical devices of the house may be turned on and off at different times to cause the load to vary in a stepwise fashion over time.

There is a continuing need for fuel cell systems addressing concerns and objectives including the foregoing in a robust, compact and cost effective manner.

SUMMARY

In one aspect, a fuel cell system is provided that includes a fuel cell having a flow field plate, where the flow field plate is adapted to provide a reactant circulation path through the fuel cell. The fuel cell has an operating temperature, such as less than 100° C. for fuel cells with sulfonated fluorocarbon polymers, or 100–200° C., as an example, for fuel cells utilizing polybenzimidazole or polyether ether ketone membranes. The invention can also apply to other types of membranes and other types of fuel cells in general.

A first catalyst material suitable for catalyzing a reaction of carbon monoxide and water at the operating temperature of the fuel cell is provided that is distinct from a second catalyst of the fuel cell (associated with the MEA). The first catalyst material is disposed on a portion of the reactant circulation path.

Embodiments may further include various other features, either alone or in combination. For example, the flow field plate can form a part of a fuel cell stack, where a manifold aperture of the flow field plate forms a portion of a reactant inlet manifold of the fuel cell stack. The first catalyst material can be disposed within the inlet manifold of the fuel cell stack. In some embodiments, the catalyst material can be disposed on a ceramic monolith housed in the manifold. The first catalyst material can also be provided in catalyst pellets housed in the manifold. The first catalyst material can also be disposed on reactant flow field channels of the fuel cell plate.

In the fuel cell, the gas diffusion layers form a portion of the reactant circulation paths, since the reactants are flowed across the GDLs which abut the flow field channels, and since the reactants ultimately diffuse through the GDLs to be reacted at the MEA. In some embodiments, the first catalyst material can be disposed on the gas diffusion layer. In the context of this invention, the term disposed is used to indicate that the catalyst is present at a certain location. Catalyst application techniques such as laminating, washcoating, and pelletizing are well known in the art, and the invention is not intended to be limited by the use of particular application techniques.

In some embodiments, the first catalyst material can be disposed on a first surface of a water transport membrane that forms a portion of the reactant circulation path. The water transport membrane can also have a second surface adapted to receive a flow of a gas comprising water vapor. For example, a fuel cell exhaust stream such as the cathode exhaust is generally saturated with water. Thus, a gas such as a cathode exhaust stream can be flowed across one side of the water transport membrane. Water present in the membrane is supplied to the shift reaction at the catalyst sites. As water in the membrane is depleted, the membrane will tend to remove water from the wet gas stream. Such water then diffuses through the membrane and is made available to the shift reaction occurring at the catalyst sites on the opposite side of the membrane.

The first catalyst material is selected to be suitable for reducing carbon monoxide in the reactant (e.g., the reformate fed to the fuel cell). As examples, the first catalyst can be made from materials including copper, zinc, platinum, and combinations thereof, as well as other materials known in the art associated with the shift reaction. The performance requirements of the catalyst may also vary. For example, tolerance to carbon monoxide poisoning may vary with MEA configurations, as well as with operation temperature, etc. In some embodiments, it is preferable that the first catalyst be present in an amount and activity suitable to reduce carbon monoxide in a reactant stream to less than 5,000 ppm. As another example, it may be preferable that the first catalyst be present in an amount and activity suitable to reduce carbon monoxide in a reactant stream from a range of 10,000–20,000 ppm to less than 5,000 ppm.

In another aspect, the invention also provides a method of operating a fuel cell, including the following steps: reacting a hydrocarbon to form reformate, wherein the reformate comprises carbon monoxide and water vapor; flowing the reformate through a fuel cell stack; and contacting the reformate with a first catalyst material suitable for catalyzing a reaction of carbon monoxide and water, wherein the first catalyst material is located inside the fuel cell stack, and wherein the first catalyst material is distinct from a fuel cell catalyst in the stack.

Embodiments of such methods may also include other features and steps as discussed herein, either alone or in combination. For example, such methods may further include flowing the reformate through a porous monolith coated with the first catalyst material, the monolith being located in an inlet manifold of the fuel cell stack. Methods may also include flowing the reformate through a plurality of catalyst pellets comprising the first catalyst material, the catalyst pellets being located in an inlet manifold of the fuel cell stack. An additional step may include flowing the reformate through a flow channel of a fuel cell in the fuel cell stack, wherein the first catalyst material is disposed on the flow channel.

Methods under the present invention may also include flowing the reformate across a gas diffusion layer of a fuel cell in the fuel cell stack, wherein the first catalyst material is disposed on the gas diffusion layer. The reformate can be flowed across a water transport membrane having a first surface and a second surface, wherein the first catalyst material is disposed on a first surface of the water transport membrane; and the method can include flowing a second gas comprising water vapor across the second surface of the water transport membrane to transfer water from the second gas to the first catalyst material.

Methods may also include maintaining a desired fuel cell operating temperature, such as less than 100° C. for fuel cells with sulfonated fluorocarbon polymers, or 100–200° C., for fuel cells utilizing polybenzimidazole or polyether ether ketone membranes. As previously discussed, the catalyst used in such methods can be made from materials including copper, zinc, platinum, and combinations thereof, as well as other materials known in the art associated with the shift reaction. Finally, such methods may also include various quantitative steps, including reacting carbon monoxide in the reformate with water in the presence of the first catalyst material to reduce a carbon monoxide level in the reformate to less than 5,000 ppm; and reacting carbon monoxide in the reformate with water in the presence of the first catalyst material to reduce a carbon monoxide level in the reformate from a range of 10,000–20,000 ppm to less than 5,000 ppm.

Advantages and other features of the invention will become apparent from the following description, drawing and claims.

DESCRIPTION OF THE DRAWINGS

FIG. 5 shows an anode fluid flow plate in accordance with one embodiment of the present invention.

FIG. 6 shows an anode fluid flow plate in accordance with one embodiment of the present invention.

DETAILED DESCRIPTION

Figure 1:
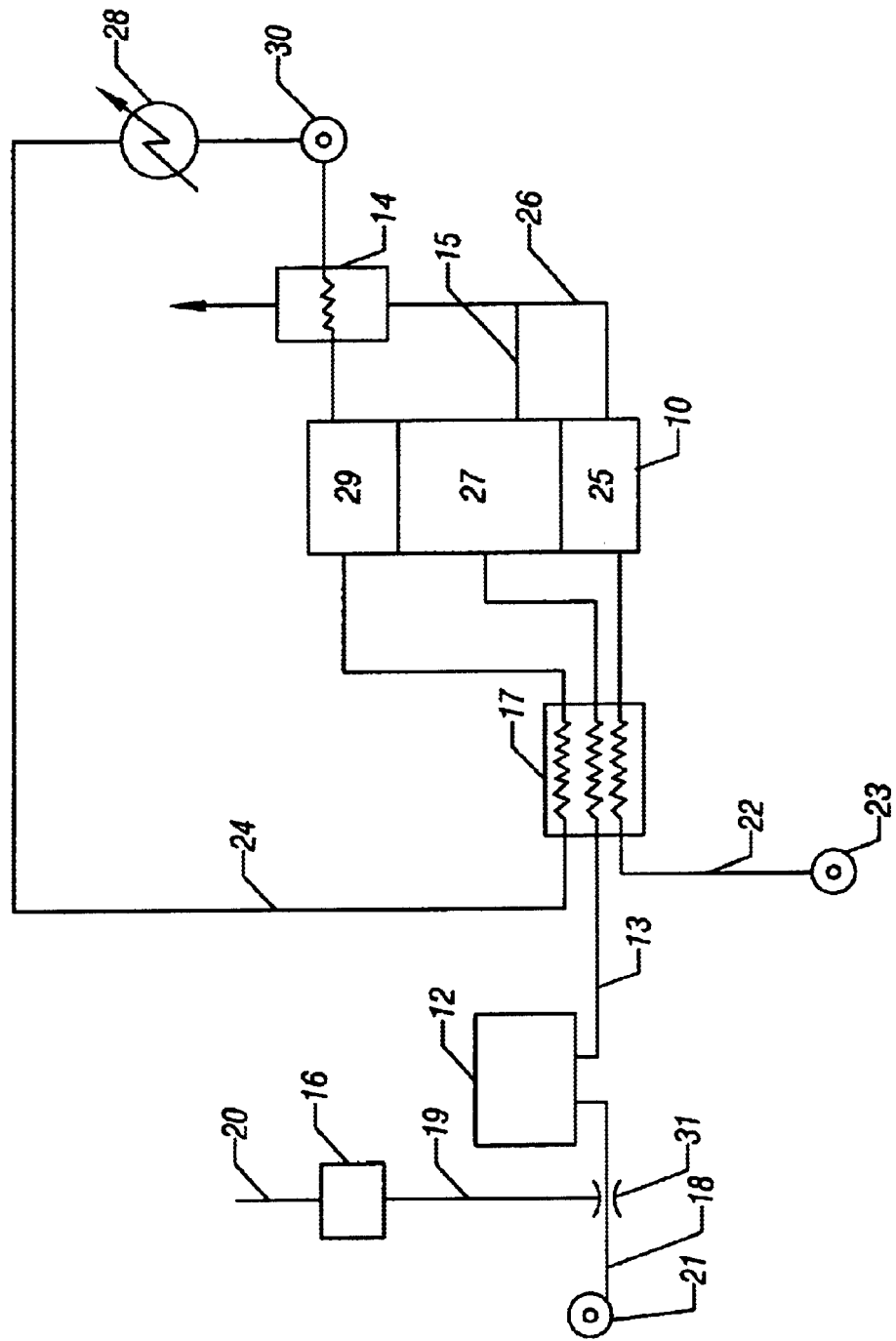
FIG. 1 shows a schematic diagram of an integrated fuel cell system.
Figure 2:
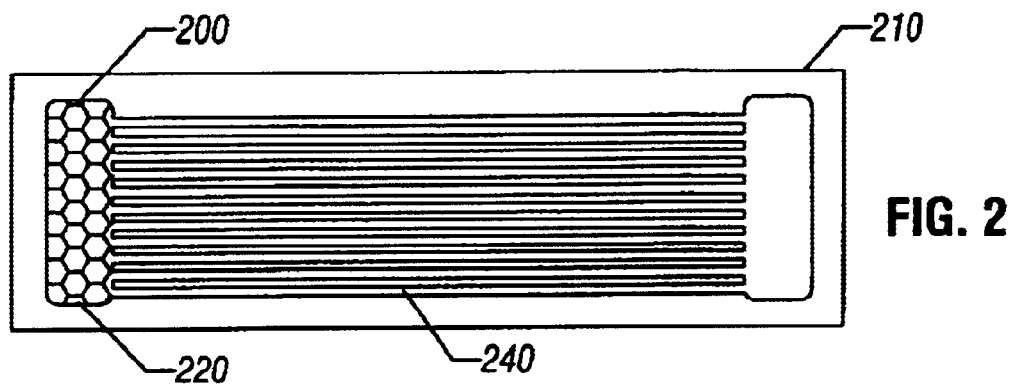
FIG. 2 shows an anode fluid flow plate in accordance with one embodiment of the present invention.
Figure 3:
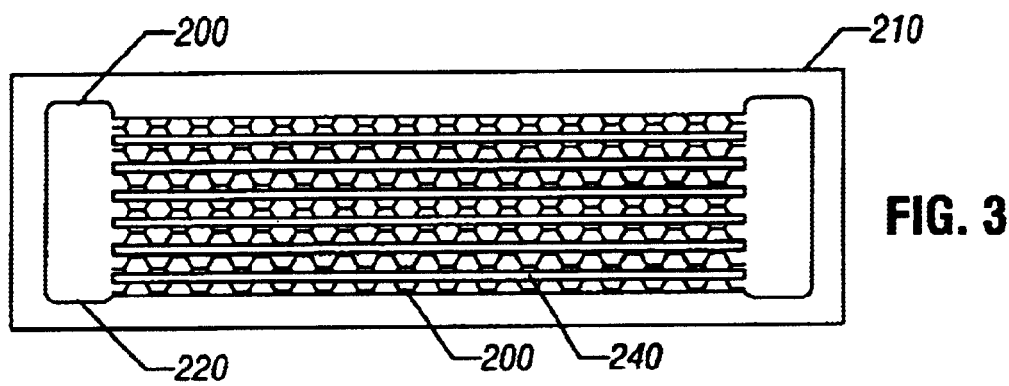
FIG. 3 shows an anode fluid flow plate in accordance with one embodiment of the present invention.
Figure 4:
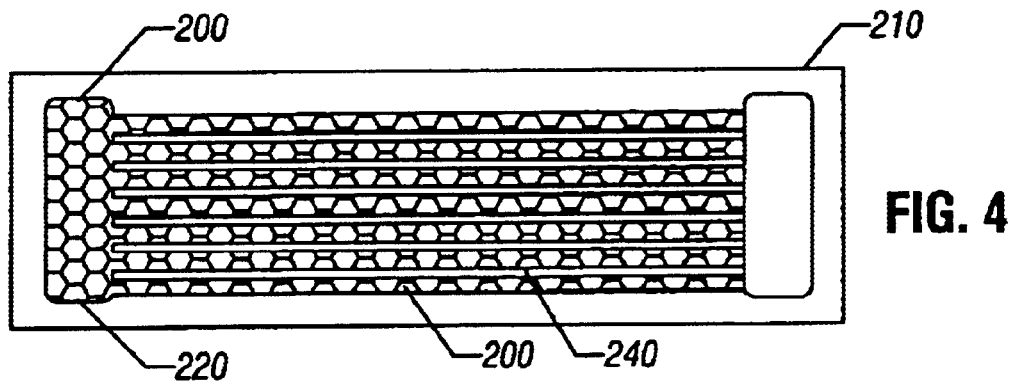
FIG. 4 shows an anode fluid flow plate in accordance with one embodiment of the present invention.

FIG. 1 illustrates an integrated fuel cell system in accordance with one embodiment of the present invention. A fuel cell stack 10 has a series of anode chambers 27, cathode chambers 25 and a coolant circuit 29. In this example, the reactants and coolant are supplied to the stack 10 via heat exchanger 17, which serves to preheat the cathode gas and cool the anode, each to about the operating temperature of the stack 10. The heat exchanger 10 also tends to equilibrate the coolant temperature with respect to the fuel and oxidant streams so that all three streams enter the stack 10 within a controlled range of temperatures.

For example, in this example, air is used as the cathode gas (oxidant gas) and is supplied from ambient via blower 23 and supplied to heat exchanger via conduit 22. The operating temperature of the fuel cell, which utilizes a polybenzimidazole polymer electrolyte membrane, is about 150–190° C. The air is preheated in heat exchanger 17 to about 150° C., as an example.

Natural gas is used as a fuel source via pressurized utility gas line 20. The natural gas is desulfurized in a sulfur-absorbent media contained in vessel 16, and is fed to fuel processor 12 (in this case an autothermal reactor) where it is reacted to form reformate containing hydrogen and carbon monoxide. The fuel processor 12 also receives a supply of ambient air via blower 21 through conduit 18. The natural gas and air are mixed at orifice 31 prior to injection into fuel processor 12. Other steps not shown, and not bearing on the present invention, may include adjusting the oxygen to fuel ratio and the amount of water vapor in the feed mixture to the fuel processor. The reformate is supplied to the heat exchanger 17 via conduit 13 at a temperature higher than the stack temperature (e.g., about 200° C.), so the heat exchanger 17 serves to cool the reformate toward the operating temperature of the stack 10.

In the context of this invention, the flow of the anode and cathode gasses through the system can be referred to as reactant circulation paths.

Spent reformate is exhausted from the stack 10 via conduit 15, and is fed to oxidizer 14 to remove residual hydrogen, carbon monoxide or hydrocarbons in the exhaust. In this example, the spent cathode exhaust is mixed with the spent anode exhaust via conduit 26 to supply the oxygen required to oxidize the anode exhaust. In this example, the oxidizer 14 is a catalytic converter, similar to an automotive catalytic converter. The oxidizer 14 must be maintained below a certain temperature (e.g., 1200° C.) to avoid damage.

Coolant circuit 24 serves to regulate the oxidizer temperature as well as the stack temperature. A coolant such as deionized water or purified glycol is circulated by pump 30. A radiator 28 is used to selectively reject heat from the coolant circuit 24 to ambient.

The fuel processor 12 may also include one or more shift reactors to shift the equilibrium of the synthesis gas toward hydrogen production. The fuel processor may include multiple shift reactor stages. The autothermal and shift reactors are sized and operated such that the reformate that is sent to the fuel cell 10 contains 100–10,000 ppm carbon monoxide. Reducing the fuel processor limitations on carbon monoxide production (e.g., lower than this range) enables a less expensive and simplified reformer design (e.g., less ATR and shift reactor catalysts, and no preferential oxidation stage required).

Suitable fuel cell stack designs are well known. A fuel cell stack may be incorporated that is based on a "high temperature" PEM, such as the polybenzimidazole ("PBI") fuel cell membranes manufactured by Celanese. U.S. patents describing this material include U.S. Pat. Nos. 5,525,436, 6,099,988, 5,599,639, and 6,124,060, which are each incorporated herein by reference. In this context, "high temperature" PEM's generally refer to PEM's that are operated at temperatures over 100° C. (e.g., 150–200° C.). Stacks based on other high temperature membrane materials such as polyether ether ketone ("PEEK") may also be suitable.

The catalyst in the fuel cell can be platinum-based, as is known in the art. A high temperature fuel cell stack of the present invention is tolerant to carbon monoxide concentrations higher than PEM systems using DuPont's Nafion™ membrane and therefore it is not necessary to include a ruthenium-based catalyst or platinum ruthenium alloy to improve carbon monoxide tolerance, and thus the cost associated with the fuel cell stack is reduced.

The ATR catalyst can be a ceramic monolith that has been wash-coated with a platinum catalyst (as known in the art, e.g., operating at over 600° C.). The shift catalyst can also be platinum wash-coated ceramic monolith (e.g., operating between 300–600° C.). The shift reactor can also include a catalyst that is operable at lower temperatures (e.g., base metal catalyst pellets operating between 100–300° C. such as described in U.S. patent application Ser. No. 09/676,841 filed Sep. 29, 2000 the contents of which are hereby incorporated by reference). Other suitable catalyst and reactor systems are known in the art.

In some embodiments, a desulfurization stage 16 may be placed upstream from the fuel processor 12 to remove sulfur compounds from the fuel before it is reacted (e.g., to avoid poisoning the catalysts of the fuel processor and/or the fuel cell stack). For example, activated carbon, zeolite, and activated nickel materials are all known in the art for such application.

As known in the art, it may be desirable to control the water to fuel ratio (e.g., steam to carbon ratio) that is fed to the ATR. For example, it may be desirable to provide on average at least two water molecules for every carbon atom provided in the fuel to prevent coking.

The PBI membrane does not require humidification like conventional sulphonated flourocarbon polymers such as DuPont's Nafion™ membranes. For this reason, in such systems the fuel cell system associated with the stack does not need a reactant or membrane humidification system, which is a substantial simplification of the fuel cell system.

In some embodiments, the permissible carbon monoxide content of the reformate can be 100–50,000 ppm. In still other embodiments, the permissible carbon monoxide content of the reformate can be greater than 1,000 ppm, or greater than 3,000 ppm.

It should be noted that fuel processors are sometimes generically referred to as reformers, and the fuel processor output gas is sometimes generically referred to as reformate, without respect to the reaction that is actually employed. The fuel utilized by the fuel processor may include natural gas, propane, methanol, or other hydrocarbons.

The fuel cell stack may utilize reactant flow field plates made from metal, carbon composite, graphite or other materials known in the art that are compatible with temperatures up to 200° C. In some embodiments, the fuel cell stack can be operated at a temperature between 150–200° C. In still other embodiments, the fuel cell stack can be operated at a temperature between 160–180° C.

A typical fuel processor, as described by the patents referenced herein, utilizes three stages, partial oxidation, a high temperature shift, and a low temperature shift. Each of these stages typically involves a catalyst coating on a cylinder shaped monolithic substrate contained within a vessel that provides flow distribution and proper thermal management. The low temperature shift portion of this reaction is optimal between 150 and 250 degrees C. Since typical high temperature stacks are operated within this range, the low temperature shift reaction may take place within the fuel cell stack. By locating the low temperature shift catalyst (and the resulting shift reaction) within the fuel cell stack, the CO within the reformate stream can be reacted in the presence of water to form hydrogen within the fuel cell.

Without wishing to be bound by theory, locating the low temperature shift catalyst within the anode flow field the equilibrium of the reaction will shift as hydrogen is consumed by the fuel cell to optimize the reaction and therefore maximize hydrogen production.

As illustrated in FIGS. 2–6, a low temperature shift catalyst 200 may be placed in various locations on fuel cell fluid flow plate 210. Catalyst 200 may also be located with the anode supply manifold 220 (FIG. 2), on the anode flow field channels 240 (FIG. 3), on both the anode supply manifold 220 and the anode flow field channels 240 (FIG. 4), on an intermediate supply manifold 260 (FIG. 5), on both the anode supply manifold 220 and the intermediate supply manifold 260 (FIG. 6), or on any combination thereof. In this example, the plate 210 is made from a machined graphite material. Metal plates can also be used, as well as plates made from other materials as known in the art.

Figure 7:
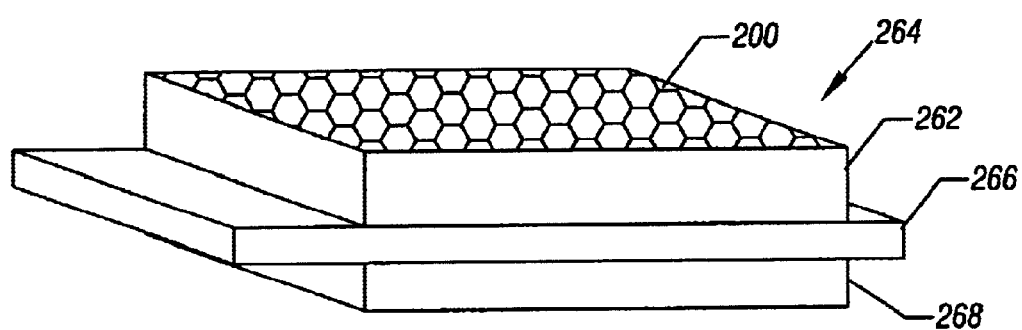
FIG. 7 shows an MEU in accordance with one embodiment of the present invention.

As illustrated in FIG. 7, the catalyst 200 of the low temperature shift reaction may be applied to the gas diffusion layer 262 of the MEU 264. The MEU is shown with MEA 266 and anode and cathode diffusion layers 262 and 268, respectively. In some embodiments, the cathode gas flow of the fuel cell system may be operated at slightly higher pressure than the anode supply, which will act to force water back through the membrane in MEA 266, thus raising the water vapor available for the low temperature shift reaction along the anode GDL 262 at catalyst 200.

Figure 8:
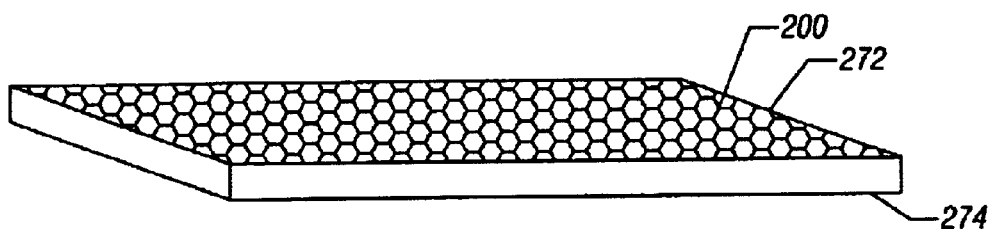
FIG. 8 shows a humidifier membrane in accordance with one embodiment of the present invention.

In another alternate embodiment of the invention, as illustrated in FIG. 8, the low temperature shift catalyst 200 may be applied to the "dry" side 272 of a membrane or tubing based humidifier. As reformate passes over the catalyst, the humidified cathode air could act as the water source and pass water vapor to the "dry" side for use within the shift reaction.

Numerous advantages of locating the low temperature shift catalyst within the fuel cell stack exist, such as, without limitation, the simplification of the fuel cell system by reducing the number of separate components and corresponding controls and connections; since the low temperature shift reaction is exothermic, it will provide heat to the stack to aid in thermal management and thermal utilization.

It will be appreciated that the invention may also be described in terms of methods for operating systems as herein described. For example, an exemplary method includes the following steps:

reacting a hydrocarbon to form reformate, wherein the reformate comprises carbon monoxide and water vapor;

flowing the reformate through a fuel cell stack; and contacting the reformate with a first catalyst material suitable for catalyzing a reaction of carbon monoxide and water, wherein the first catalyst material is located inside the fuel cell stack, and wherein the first catalyst material is distinct from a fuel cell catalyst in the stack.

Various features and additional steps may be further defined. For example, such methods may include flowing the reformate across a gas diffusion layer of a fuel cell in the fuel cell stack, wherein the first catalyst material is disposed on the gas diffusion layer. The reformate can be flowed across a water transport membrane having a first surface and a second surface, wherein the first catalyst material is disposed on a first surface of the water transport membrane; and the method can include flowing a second gas comprising water vapor across the second surface of the water transport membrane to transfer water from the second gas to the first catalyst material.

Methods may also include maintaining a desired fuel cell operating temperature, such as less than 100° C. for fuel cells with sulfonated fluorocarbon polymers, or 100–200° C., for fuel cells utilizing polybenzimidazole or polyether ether ketone membranes. Methods. As previously discussed, the catalyst used in such methods can be made from materials including copper, zinc, platinum, and combinations thereof, as well as other materials known in the art associated with the shift reaction. Finally, such methods may also include various quantitative steps, including reacting carbon monoxide in the reformate with water in the presence of the first catalyst material to reduce a carbon monoxide level in the reformate to less than 5,000 ppm; and reacting carbon monoxide in the reformate with water in the presence of the first catalyst material to reduce a carbon monoxide level in the reformate from a range of 10,000–20,000 ppm to less than 5,000 ppm.

Embodiments of such methods may also include other features and steps as discussed herein, either alone or in combination. For example, such methods may further include flowing the reformate through a porous monolith coated with the first catalyst material, the monolith being located in an inlet manifold of the fuel cell stack. Methods may also include flowing the reformate through a plurality of catalyst pellets comprising the first catalyst material, the catalyst pellets being located in an inlet manifold of the fuel cell stack. An additional step may include flowing the reformate through a flow channel of a fuel cell in the fuel cell stack, wherein the first catalyst material is disposed on the flow channel.

While the invention has been disclosed with respect to a limited number of embodiments, those skilled in the art, having the benefit of this disclosure will appreciate numerous modifications and variations therefrom. It is intended that the invention covers all such modifications and variations as fall within the true spirit and scope of the invention.

What is claimed is:

1. A fuel cell system comprising:
   a fuel cell having a flow field plate;
   wherein the flow field plate is adapted to provide a reactant circulation path through the fuel cell;
   wherein the fuel cell has an operating temperature;
   a first catalyst material suitable for catalyzing a reaction of carbon monoxide and water at the operating temperature of the fuel cell, wherein the catalyst material is distinct from a second catalyst of the fuel cell;
   wherein the first catalyst material is disposed on a portion of the reactant circulation path.

2. The system of claim 1, wherein the flow field plate forms a part of a fuel cell stack;
   wherein a manifold aperture of the flow field plate forms a portion of a reactant inlet manifold of the fuel cell stack; and
   wherein the first catalyst material is disposed within the inlet manifold of the fuel cell stack.

3. The system of claim 2, further comprising a ceramic monolith housed in the manifold, wherein the first catalyst material is disposed on the monolith.

4. The system of claim 2, further comprising catalyst pellets housed in the manifold, wherein the first catalyst material forms a portion of the catalyst pellets.

5. The system of claim 1, wherein the flow field plate comprises reactant flow field channels, and wherein the first catalyst material is disposed on the reactant flow field channels.

6. The system of claim 1, further comprising a gas diffusion layer that forms a portion of the reactant circulation path, wherein the first catalyst material is disposed on the gas diffusion layer.

7. The system of claim 1, further comprising a water transport membrane that has a first surface that forms a portion of the reactant circulation path, wherein the first catalyst material is disposed on the first surface of the water transport membrane.

8. The system of claim 7, wherein the water transport membrane has a second surface adapted to receive a flow of a gas comprising water vapor.

9. The system of claim 1, wherein the operating temperature of the fuel cell is less than 100° C.

10. The system of claim 1, wherein the operating temperature of the fuel cell is between 100–200° C.

11. The system of claim 1, wherein the fuel cell comprises at least one polymer electrolyte membrane.

12. The system of claim 1, wherein the fuel cell comprises at least one polybenzimidazole polymer electrolyte membrane.

13. The system of claim 1, wherein the fuel cell comprises at least one polyether ether ketone polymer electrolyte membrane.

14. The system of claim 1, wherein the first catalyst material is suitable for reducing carbon monoxide in the reactant circulation path to less than 5,000 ppm.

15. The system of claim 1, wherein the first catalyst material is suitable for reducing carbon monoxide in the reactant circulation path from a range of 10,000–20,000 ppm to less than 5,000 ppm.

16. The system of claim 1, wherein the first catalyst material comprises copper.

17. The system of claim 1, wherein the first catalyst material comprises zinc.

18. The system of claim 1, wherein the first catalyst material comprises platinum.

* * * * *